2,892,780

ALKYD GELS AND COMPOSITIONS CONTAINING THE SAME

Jacobus Rinse, Bernardsville, N.J., assignor to J. W. Ayers & Co., Easton, Pa., a corporation of Delaware No Drawing. Application March 9, 1956
Serial No. 570,423

22 Claims. (Cl. 252—35)

This invention relates to alkyd gel products, to coating compositions and vehicles containing the same, and as well to processes of producing such materials. More particularly, it relates to gelled products derived from alkyd resins through their reaction with certain organic aluminum derivatives.

In my copending application Serial No. 439,473, now abandoned, I have disclosed that alkoxy aluminum acylates will react with alkyd resins on heating and will yield vehicles for paints of a wide variety of viscosities.

An object of the invention is to provide resinous alkyd compounds and compositions in gelled form which retain the desirable inherent properties of the particular alkyd resin employed in producing the same. Another object is to provide alkyd resin gelled vehicles for paints, lubricants and other protective coating compositions in the form of gelatinous alkyd resin-hydrocarbon compositions.

An ultimate object of the invention is to provide thixotropic paints or so-called gel-paints or dripless paints which are solid during standing but liquefy under movement and during brushing out. Another ultimate object is to prepare lubricants having increased dropping points.

Broadly defined, the process of the present invention for the production of the gelled alkyd compounds may be considered to involve the reaction of alkyd resins containing free hydroxy groups with aluminum compounds defined by the general formula:

wherein $a$ and $b$ may be acyloxy-radicals, may be hydrocarbonoxy— radicals, or may be an oxo= radical together and $b$ may be an hydroxy— radical provided $a$ is a hydrocarbon-oxy— radical. The aluminum compounds used should be substantially pure or free of aluminum side-products, particularly metallic aluminum, present in the usual aluminum-alcohol-catalyst reaction masses.

The reaction of the alkyd resins with the aluminum compounds can be accomplished by heating the reactants at a temperature between about 100° and 250° C. until gelling or complete solidification of the alkyd resin occurs, the time usually required varying between 10 and 60 minutes. In most instances a temperature between 150° and 200° C. is preferred.

The preferred aluminum compounds covered by the foregoing formula may be divided into four classes as follows:

(1) Hydroxy, alkoxy, aluminum acylates, and the corresponding phenoxy compounds.

(2) Alkoxy aluminum acylates including the monoalkoxy, diacylates and as well the di-alkoxy, monoacylates, and as well the corresponding phenoxy compounds.

(3) True aluminum triacylates, and (4) Oxo-aluminum acylates.

The copolymers and mixed polymers producible from these aluminum compounds may likewise be employed in the products and compositions of the invention. Such polymers may be obtained from the hydroxy alkoxy aluminum acylates simply by heating, as to 80° C. or more, and from the dialkoxy aluminum monoacylates and oxo-aluminum acylates by heating them to such temperatures in the presence of an equivalent amount of water, glycol or other polyol, hydroxy carboxylic acid or dicarboxylic acid. Examples of such polymers are diacyloxy, aluminum-oxy-aluminum diacylate and

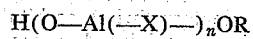

wherein X is an acyloxy group and R is a hydrocarbon.

The acylate radicals may be derived from carboxylic acids of any character and of any chain length of from three carbon atoms up, including normal and branched acids, either saturated or unsaturated, the preferred acids being fatty acids of higher molecular weight such as octoic, oleic and stearic acids.

The hydrocarbon radicals of hydrocarbon-oxy groups appearing in a preferred class of the aluminum compounds of the invention may be cyclic or acyclic, saturated or unsaturated, straight or branched, and may contain any number of carbon atoms from one up. Among the preferred are lower molecular alkyl radicals, of both the normal and iso structure, as those containing 3 to 6 carbon atoms. Among the aromatics, there may be mentioned the benzyl radical, and the phenyl radical and substituted phenyl radicals, as the butyl- and amyl- phenyl radicals, these phenyl-containing radicals being encompassed broadly herein by the term "phenoxy."

Finally, the acylate, alcoholate and phenolate radicals of the aluminum compounds may be substituted as well as unsubstituted and be derived from dicarboxylic acids, glycols, glycolic acids or from such compounds which have been substituted at a carbon atom or atoms by any atoms or radicals which do not interfere with the required activity of the aluminum compounds, as those containing nitrogen or oxygen, as in ether and ester substituent groups.

The quantity of aluminum compound required to effect gellation of the alkyd resin depends upon the nature of the specific compounds employed and upon other factors, but ordinarily amounts as low as 0.3% or as high as 10% or a somewhat greater amount accomplishes the desired degree of gellation. Ordinarily, lesser quantities of the monoacylates and of the lower acylates are required than of the polyacylates or the acylates of higher molecular weight. Generally, best results are obtained when the aluminum content of the aluminum alkyd compound lies within the range of 0.05% and 2.0% calculated on the solids content. In any particular formulation, the required or optimum amount of aluminum compound can be determined by simple trial, for if an inadequate amount is not present, proper gelling does not occur.

The reaction between the alkyd resin and the alcoholate may be effected simply by mixing and heating the reactants. In a preferred embodiment, however, the reaction is carried out in the presence of an inert hydrocarbon solvent for the alkyd resin such as mineral spirits. Most suitably the alkyd resin is first dissolved in the hydrocarbon oil or solvent.

During the heating of the reaction mixture the mass changes to the gel form gradually, and eventually solidification will occur. The aluminum compound may be added all at once or in portions over a period of time during the heating operation.

The time required for gellation in any particular reaction may be determined by test, for the treatment is complete when the gel of the desired properties is obtained or when no further increase in viscosity or gel strength is observed. Upon completion of the reaction, the gel may simply be cooled, or if a specific use is anticipated for the gel it can be diluted while hot with the appropriate hydrocarbon solvent or with a mineral oil. The diluted alkyd gel is then ready for sale to, or use by, compounders of the protective coating compositions herein described.

The instant invention is applicable to alkyd resins as a class having free hydroxy groups, and includes products referred to as "polyester resins." They also may be defined as resin compounds resulting from the reaction of polyols and dicarboxylic acids, having acid values below 15. The polyalcohol component of the resin may be any of those available in the trade, as for example, glycol, glycerol, pentaerythritol, sorbitol and the like and also epoxy resins containing free epoxy groups, which act like hydroxy groups, and the dicarboxylic acid may be any of the conventional types, as for example, phthalic, or maleic, or fumaric acid. For preparing the alkyd resins having free hydroxy groups, the usual excess of polyol is satisfactorily employed, that is, at least about 10% of total weight of polyalcohol. From about 5 to 50% excess, however, may be used to advantage.

Not only may the straight alkyd resins be used, but also the modified alkyds may be employed and generally the latter are preferred. In the production of paints, alkyd resins modified by higher molecular unsaturated fatty acids, or with drying oils are preferred, whereas in the production of lubricants, alkyd resins modified by higher molecular saturated fatty acids or non-drying oils generally give best results.

Other modified alkyds operable in the process and products of the present invention include those which have been modified by an addition of natural resin acids or with phenolic-aldehyde resins. Experimental results indicate that the aluminum compounds herein described will attach to any alkyd resin containing free hydroxy groups and impart gel properties thereto, and accordingly, the presence of substituents in the alkyd resin molecules of modified type do not interfere with the reaction.

When the alkyd component is obtained from dicarboxylic acids with epoxy resins the preferred epoxy-alkyd resin gelling compounds are obtained from drying oil modified or semi-drying oil modified alkyd resins, many examples of which are described in the literature, these compounds being collectively referred to hereinafter as "alkyd resins modified by radicals of oils having drying properties." The epoxy resin may be any of the known film-forming epoxy resins, e.g. those prepared from bisphenols and epichlorohydrine.

*Example 1*

One hundred parts of a 30% soy bean oil-modified, phthalic anhydride-glycerol, alkyd resin solution in mineral spirits (ratio 1:1) are heated to 160° C. and thereupon 5 parts of true aluminum trioleate are added in the form of a solution in 5 parts of mineral spirits. The reaction mass is then heated at 170° C. for a period of 1 hour at which time the alkyd resin has gelled. The composition obtained is suitable as a vehicle for rapid drying thixotropic paints and may be compounded with the usual pigments, solvents and driers to accomplish this end.

*Example 2*

The alkyd solution defined in Example 1 is mixed at a temperature of 160° C. with 0.5% of polymerized hydroxy, amylphenoxy, aluminum octoate and heated at 175° C. for 45 minutes. The resulting gel is then diluted by the addition of mineral spirits to provide a solution containing a solids content of 35%. The gel obtained is pumpable and like the product of Example 1 is suitable as a vehicle for thixotropic paints. This may be accomplished by mixing together 50 parts of the alkyd gel with 50 parts of mineral spirits, 25 parts rutile titanium dioxide and 50 parts whiting. The resulting paint is liquid when freshly made, gels on storage and brushes out very easily and smoothly when applied as a coating.

*Example 3*

Another quantity of the alkyd solution of Example 2 is mixed at 160° C. with 1.0% isopropoxy aluminum dioleate and heated at 175° C. for a period of 1 hour. The gel obtained is miscible with mineral spirits.

*Example 4*

A 50% solution in mineral spirits of a 29% phthalic anhydride soybean oil modified alkyd resin is heated at 170° C. with isopropoxy-amylphenoxy-aluminum acetate in a quantity of 1% until the batch has gelled completely, which takes about 60 minutes. The gel is diluted with more mineral spirits until a solution having a 40% nonvolatile content is obtained. The solution is suitable for use as a vehicle for thixotropic paints.

*Example 5*

One hundred parts of stearic acid-modified, phthalic-glycerol, alkyd resin, prepared by esterifying 70 parts of stearic monoglyceride with 30 parts of phthalic anhydride is dissolved in 120 parts of a light mineral lubricating oil, and 25 parts of polymerized oxo-aluminum stearate are added. The resulting mixture is then heated at 200° C. until the batch gels, the time normally required being 2 hours. The resulting gel has a dropping point of 150° C. and is stiff at 20° C.

*Example 6*

Two hundred parts of a polyester prepared from maleic anhydride and dipropylene glycol is mixed with 2 parts of hydroxy, isopropoxy, aluminum stearate and stirred until the desired degree of viscosity or gellation is obtained. The resulting product is dissolved in a hydrocarbon such as mineral spirits for the uses herein described, or it is dissolved in styrene in which case a polyester composition is provided suitable for producing molded objects.

*Example 7*

An Epon resin vehicle is prepared by heating 27.6 wt. parts Epon 1004, 64 parts soy bean oil, 4.9 parts Petrex, and 3.4 parts adipic acid until, at 40% solids in solution in mineral spirits, the Gardner viscosity is between R and W. One hundred parts of this varnish are heated for one hour at 160–170° C. with a 1% addition of phenoxy, hydroxy, aluminum oleate. In the Handbook of Material Trade Names by Zimmerman and Lavine (1953) Petrex is defined as follows: "A synthetic resinous, polybasic acid of terpene origin. It consists essentially of 3-isopropyl-6-methyl-3,6-endoethylene. It has a softening point of 40–50° C., and an acid number of approx. 530." Epon 1004 is a condensation product of bisphenol with epichlorohydrine.

The resulting viscous liquid becomes a soft gel after cooling and is very suitable for the preparation of thixotropic paints.

*Example 8*

One gram of a 50% solution of a 30% phthalic soy bean alkyd in mineral spirits is heated at 160–170° C. with two grams of a solution of isopropoxy methylglycoxy aluminum oleate prepared by mixing 28 grams of oleic acid, 20 grams of di-isopropoxy aluminum methylglycolate and 16 grams of mineral spirits. A smooth gel is formed which is suitable as a vehicle for thixotropic paints.

From this example, it will be observed that the aluminum compound can be employed in the solution in which it is produced containing the liberated alcohol. Other fatty acids may be employed and the amount utilizable can be as high as three mols to one mol in relation to the quantity of the aluminum compound used without it being necessary to distill off the alcohol formed by the reaction with the fatty acid. By utilization of an aluminum compound produced from a proper alcohol, e.g. methylglycol, the monoacylate will remain in liquid form.

Where gels completely stable to hydrolysis are desired, the required time of heating of the mixture of the alkyd and the aluminum compound to obtain this result may be determined by checking the reaction product through adding a few drops of water to 20 gram samples of the same, heating the mixture to a temperature between 100° and 150° C. until all water is boiled off, cooling the mass, then replacing any hydrocarbon solvent evaporated during the heating and testing the strength of the gel. If no loss in gel strength is observed, then the product is hydrolysis stable, for hydrolyzable gels, on reacting with water, thin down or weaken.

This application is a continuation-in-part of my earlier copending applications Serial No. 495,061 filed March 17, 1955 now Patent No. 2,835,685 and Serial No. 527,137 filed August 8, 1955 now Patent No. 2,852,411.

It should be understood that the present invention is not limited to the specific reactants and reaction conditions herein disclosed but that it covers all equivalents which will occur to those skilled in the art upon consideration of the scope of the claims appended hereto.

I claim:

1. A process for the preparation of alkyd gels which comprises reacting an alkyd resin containing free hydroxy groups with an aluminum acylate compound selected from the group consisting of those within the basic formula:

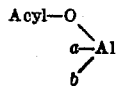

wherein $a$ and $b$ may be acyloxy-radicals, hydrocarbon-oxy— radicals, an oxo= radical together and $b$ may be an hydroxy— radical provided $a$ is a hydrocarbon-oxy— radical.

2. A process for the preparation of alkyd gels which comprises heating together a solution of an alkyd resin containing free hydroxy groups with an aluminum compound of the formula defined in claim 1 until gellation occurs.

3. A process for the preparation of alkyd gels which comprises reacting an unsaturated fatty acid modified alkyd resin containing free hydroxy groups with an aluminum compound of the formula defined in claim 1 until gellation occurs.

4. A process for the preparation of alkyd gels which comprises reacting a saturated fatty acid modified alkyd resin containing free hydroxy groups with an aluminum compound of the formula defined in claim 1 until gellation occurs.

5. A process for the preparation of alkyd gels which comprises heating together an alkyd resin containing free hydroxy groups with an aluminum compound of the formula defined in claim 1 at a temperature of about 150° to 250° C. until a reaction occurs and a gel is formed.

6. A process for the preparation of alkyd gels which comprises heating together an alkyd resin containing free hydroxy groups, in solution in a hydrocarbon with an aluminum compound of the formula defined in claim 1 at a temperature of about 150° to 250° C. until an alkyd gel solution is obtained.

7. A process for the preparation of a gel-forming vehicle for coating compositions which comprises heating and reacting together an epoxy-alkyd resin modified by radicals of oils having drying properties, said modified resin containing free hydroxy groups, and an aluminum compound of the formula defined in claim 1 until the mass will form a gel on cooling.

8. The process defined in claim 7 wherein the aluminum compound is phenoxy, hydroxy aluminum oleate.

9. The process for forming solid diacylate gels of aluminum which comprises reacting an alkyd resin having free hydroxy groups with a true aluminum triacylate by increasing the temperature to a level at which reaction occurs by double decomposition.

10. An alkyd gel comprising the reaction product formed at from 100° to 250° C. of an alkyd resin containing free hydroxy groups with an aluminum compound of the formula defined in claim 1.

11. An alkyd gel comprising the reaction product formed at from 100° to 250° C. of an unsaturated fatty acid modified alkyd resin containing free hydroxy groups with an aluminum compound of the formula defined in claim 1.

12. An alkyd gel comprising the reaction product formed at from 100° to 250° C. of a saturated fatty acid modified alkyd resin containing free hydroxy groups with an aluminum compound of the formula defined in claim 1.

13. A resin gel base for paints, lubricants and other coating compositions which comprises a gelatinous solution of a reaction product formed at from 100° to 250° C. of an alkyd resin containing free hydroxy groups with an aluminum compound of the formula defined in claim 1 in a hydrocarbon.

14. A resin gel vehicle for paints which comprises a gelatinous solution of a reaction product formed at from 100° to 250° C. of an unsaturated fatty acid modified alkyd resin containing free hydroxy groups with an aluminum compound of the formula defined in claim 1 in a hydrocarbon solvent.

15. A lubricant which comprises a gelatinous solution of a reaction product formed at from 100° to 250° C. of a saturated fatty acid modified alkyd resin containing free hydroxy groups with an aluminum compound of the formula defined in claim 1 in a mineral lubricating oil.

16. Gel paints containing as the binding agent an alkyd gel comprising the reaction product formed at from 100° to 250° C. of an alkyd resin containing free hydroxy groups with an aluminum compound of the formula defined in claim 1.

17. Gel-forming coating compositions containing the gelled reaction product formed at from 100° to 250° C. of an epoxy-alkyd resin modified by radicals of oils having drying properties, said modified resin containing free hydroxy groups, and an aluminum compound of the formula defined in claim 1.

18. An alkyd gel comprising the reaction product formed at from 100° to 250° C. of an alkyd resin containing free hydroxy groups with an hydroxy, alkoxy, aluminum acylate, said acylate radical having at least three carbon atoms.

19. An alkyd gel comprising the reaction product formed at from 100° to 250° C. of an alkyd resin containing free hydroxy groups with an alkoxy aluminum acylate, said acylate radical having at least three carbon atoms.

20. An alkyd gel comprising the reaction product formed at from 100° to 250° C. of an alkyd resin containing free hydroxy groups with an aluminum tri-acylate, said acylate radical having at least three carbon atoms.

21. An alkyd gel comprising the reaction product formed at from 100° to 250° C. of an alkyd resin containing free hydroxy groups with an hydroxy phenoxy aluminum acylate, said acylate radical having at least three carbon atoms.

22. An alkyd gel comprising the reaction product formed at from 100° to 250° C. of an alkyd resin containing free hydroxy groups with an oxo-aluminum acylate, said acylate radical having at least three carbon atoms.

References Cited in the file of this patent

UNITED STATES PATENTS

| | | |
|---|---|---|
| 2,169,577 | Bradley | Aug. 15, 1939 |
| 2,321,463 | Condit | June 8, 1943 |
| 2,582,833 | Hunn | Jan. 15, 1952 |
| 2,618,636 | Hunn | Nov. 18, 1952 |
| 2,630,445 | Delaune | Mar. 3, 1953 |
| 2,643,228 | Bond | June 23, 1953 |
| 2,744,074 | Theobald | May 1, 1956 |

FOREIGN PATENTS

| | | |
|---|---|---|
| 519,092 | Belgium | Apr. 30, 1953 |
| 156,644 | Australia | May 21, 1954 |
| 712,055 | Great Britain | July 14, 1954 |